J. STRATTON.
Supplying Air to Gas Burners.
No. 89,952.
Patented May 11, 1869.
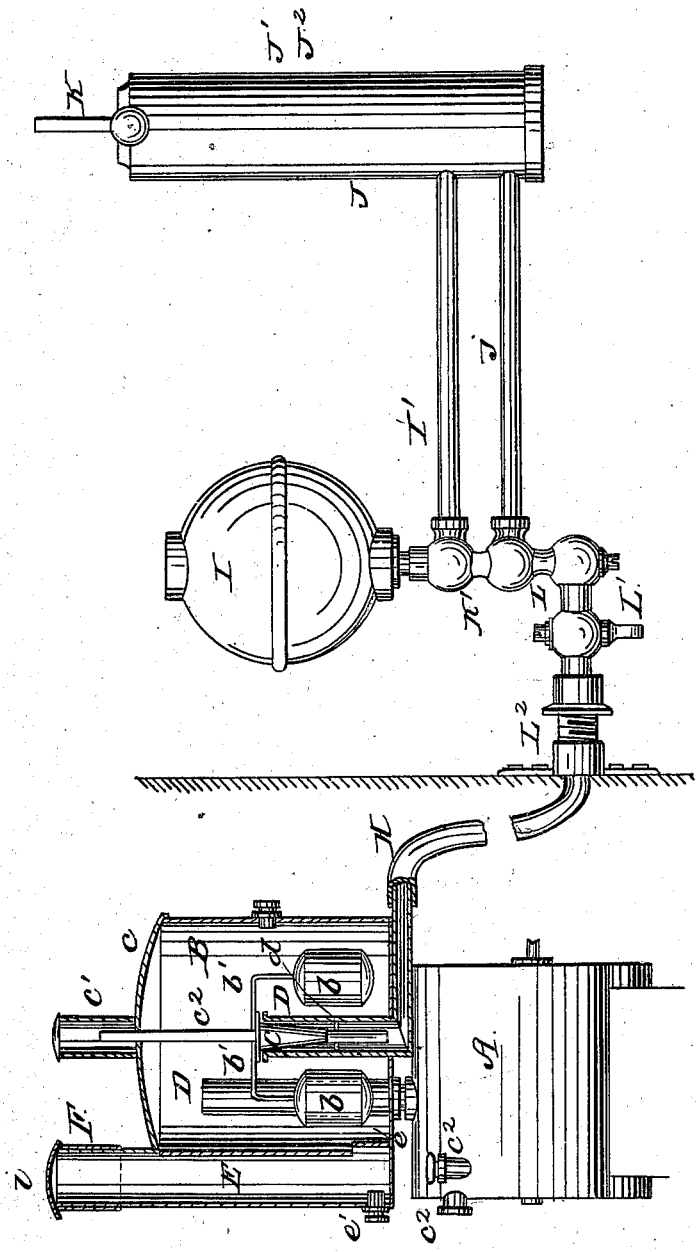

UNITED STATES PATENT OFFICE.

JAMES STRATTON, OF PHILADELPHIA, PENNSYLVANIA, ASSIGNOR TO W. W. GLENTWORTH, OF SAME PLACE.

IMPROVEMENT IN APPARATUS FOR SUPPLYING AIR TO HYDROCARBON-BURNERS.

Specification forming part of Letters Patent No. 89,952, dated May 11, 1869.

To all whom it may concern:

Be it known that I, JAMES STRATTON, of the city and county of Philadelphia, and State of Pennsylvania, have invented a new and Improved Apparatus for Supplying Air to Hydrocarbon-Burners; and I do hereby declare that the following is a full, clear, and exact description of the construction and operation of the same, reference being had to the accompanying drawing, making a part of this specification, in which—

The drawing represents a longitudinal vertical section of my invention.

This invention relates to an improvement in the method of supplying air to hydrocarbon-burners, whereby a fan is employed which forces a current of air into a reservoir partially filled with water, in which are two or more floats which regulate a valve communicating with a pipe of any desired length, which conducts the air to the burner.

It also relates to an improved swinging bracket-lamp, to be used in connection with the other parts of the invention.

In the drawing, A represents a cylinder, in which is a fan of ordinary construction, which is operated in any desired manner.

B represents a reservoir, which is about half full of water, on which rest the floats $b\,b$, which are attached by means of the arms $b'\,b'$ to the tapering valve C. The reservoir B is provided with the air-tight cover $c$, on which is the cylindrical projection $c'$, whose object is to afford room for the upper end of the rod $c^2$ of the valve C. The air from the fan is admitted to the reservoir by means of the vertical pipe D, whose upper end is above the surface of the water.

D' represents the pipe, through which the air passes on its way to the burner, the upper end of which is also above the water, although somewhat lower than that of the pipe D. The valve C is provided with the rod $c^2$, which passes through a suitable orifice in the perforated partition $d$ of pipe D' nearly to the bottom of the same when the valves close, and its upper end passes through an orifice in the cover $c$ with the projection $c'$.

E represents a vertical tube beside the reservoir B, and communicating with the same by means of the opening $e$.

$e'$ is a vent by which the water is let off when desired, and $e^2\,e^2$ are similar vents in the cylinder A to let off the air.

The tube E has a cover, F, in which is an orifice, $i$. The tube D is bent at right angles at the bottom of the reservoir, and, passing out from thence, communicates with the flexible or metallic tube H, which may be of any suitable length, and conducts the air to the lamp-burner.

I represents a spherical reservoir, which contains the oil and communicates by means of the tube E with the lamp J, which consists of the oil-chamber J' and the annular air-passage $J^2$, extending around the same and conveying the air, which enters through the tube $j$, to the burner K, which is of ordinary construction.

K' represents a plug-stem, which supports the entire bracket, and is pivoted, after the manner of ordinary gas-brackets, in the holder L, which is provided with the cock L', and is screwed onto the support $L^2$, which latter is suitably attached to the wall of an apartment.

The operation of my invention is as follows: The oil-reservoir being filled and the lamp lighted, when it is desired to increase the light the cock L' is opened and the fan set in motion. The water in the reservoir B being sufficiently deep to open the valve, the air rushes up through the pipe D into the upper part of the reservoir, and thence down through the pipe D', with its perforated partition, and through the tubes H and $j$ to the annular passage J', which surrounds the burner. When it is desired to decrease the light, the cock is partially closed, and the air, finding its egress through the pipe D' impeded, presses on the surface of the water, thereby causing the same to rise in the tube E (the air which is displaced thereby passing out at the orifice $i$) and to fall correspondingly in the reservoir B, thus lowering the floats and partially closing the valve C, which, by reason of its tapering form, regulates the opening to a degree exactly in proportion to the opening of the cock. By this arrangement an exact regulation of the flow of air is obtained, and the light increased or diminished, as desired.

Having thus described my invention, what I claim as new, and desire to secure by Letters Patent, is—

1. The tapering valve C, with its floats $b$ and rod $c^2$, in combination with the reservoir B and pipes D and H, arranged and operating substantially as described.

2. The reservoir B and tube E, in combination with the fan-cylinder A and pipe D, as and for the purpose described.

JAMES STRATTON.

Witnesses:
 WM. P. HIBBERD,
 S. F. HILL.